United States Patent
Kim et al.

(10) Patent No.: US 8,419,615 B2
(45) Date of Patent: Apr. 16, 2013

(54) ARC-SHAPED FLEXIBLE PRINTED CIRCUIT FILM TYPE ENDOSCOPE USING IMAGING DEVICE WITH DRIVING HOLES

(75) Inventors: Gyung-Sub Kim, Suwon-si (KR); Jang-Myong Woo, Yongin-Si (KR); Sang-Hoon Choi, Yongin-Si (KR)

(73) Assignee: Korea Plant Service & Engineering Co., Ltd., Seongnam-Si (KR)

( * ) Notice: Subject to any disclaimer, the term of this patent is extended or adjusted under 35 U.S.C. 154(b) by 433 days.

(21) Appl. No.: 12/696,953

(22) Filed: Jan. 29, 2010

(65) Prior Publication Data

US 2011/0118548 A1 May 19, 2011

(30) Foreign Application Priority Data

Nov. 19, 2009 (KR) ........................ 10-2009-0111959

(51) Int. Cl.
*A61B 1/00* (2006.01)
(52) U.S. Cl.
USPC ........................................................ 600/106
(58) Field of Classification Search ............... 600/106
See application file for complete search history.

(56) References Cited

U.S. PATENT DOCUMENTS

| | | | | |
|---|---|---|---|---|
| 6,142,930 A | * | 11/2000 | Ito et al. | 600/109 |
| 6,293,910 B1 | * | 9/2001 | Yamakita et al. | 600/132 |
| 7,300,397 B2 | * | 11/2007 | Adler et al. | 600/110 |
| 8,052,596 B2 | * | 11/2011 | Kim | 600/129 |
| 2002/0028982 A1 | * | 3/2002 | Takahashi | 600/110 |
| 2004/0176661 A1 | * | 9/2004 | Futatsugi | 600/110 |

FOREIGN PATENT DOCUMENTS

| | | |
|---|---|---|
| JP | 2008-135894 A | 6/2006 |
| JP | 2006-319401 A | 11/2006 |
| KR | 10-0960262 B1 | 5/2010 |
| WO | WO 90/09910 A1 | 9/1990 |

* cited by examiner

*Primary Examiner* — Rodney Fuller
(74) *Attorney, Agent, or Firm* — Birch, Stewart, Kolasch & Birch, LLP

(57) ABSTRACT

An arc-shaped flexible printed circuit film-type endoscope using an imaging device with driving holes. The endoscope has an image photographing device and an object insertion device and further includes a plurality of driving holes which are formed at regular intervals in a longitudinal direction of the object insertion device, and a driving device which rotates while being sequentially inserted into the driving holes, thus moving the object insertion device. The endoscope controls movement into a small space, makes it easy to inspect a narrow heat transfer tube or gaps formed between heat transfer tubes, achieves high economic efficiency, increases the reliability of endoscopy, and increases life-span.

4 Claims, 5 Drawing Sheets

PRIOR ART

PRIOR ART

PRIOR ART

ARC-SHAPED FLEXIBLE PRINTED CIRCUIT FILM TYPE ENDOSCOPE USING IMAGING DEVICE WITH DRIVING HOLES

BACKGROUND OF THE INVENTION

1. Field of the Invention

The present invention relates generally to an industrial endoscope and, more particularly, to an arc-shaped flexible printed circuit film type endoscope using an imaging device with driving holes, in which the driving holes are formed at regular intervals in a longitudinal direction in the endoscope having a flexible printed circuit film connected to a head housing accommodating a charge coupled device (CCD) or complementary metal-oxide-semiconductor (CMOS) sensor as the imaging device, and interact with a driving device having a toothed part such as an intermittent gear or sprocket, thus allowing the endoscope to be precisely driven.

2. Description of the Related Art

Generally, a plurality of heat transfer tubes is mounted on the tube sheet of a secondary side of a steam generator installed in a nuclear power plant, with very narrow gaps formed between the heat transfer tubes. Here, sludge or impurities may enter the gaps between the heat transfer tubes, thus causing damage to the heat transfer tubes.

Therefore, in order to prevent the heat transfer tubes from being damaged by the sludge or impurities, visual inspection is periodically conducted. The visual inspection is performed through endoscopy using an endoscope camera which is mounted to a micro robot or the like.

Endoscopy is the non-destructive inspection method of visually inspecting the interior of a human body organ or an object without impairing the human body organ or the object, by inserting an insertion tube into the human body organ or the object.

Endoscopes are typically classified into medical and industrial endoscopes according to the object to be inspected. Among them, the manufacture of the industrial endoscope is difficult because its insertion part is small and thin.

Thus, in Korea, the industrial endoscope has not been researched and developed nor has it come onto the market yet. The supply of most endoscopes depends on imports.

The industrial endoscope includes an input-output unit for visually inspecting an object, a light source, and an insertion tube. Since most inspection instruments are too large to be inspected by an inspector, a lot of time, labor and expense are required.

Further, the industrial endoscope adopts an analogue method. Thus, in order to store photographed images, photographs must be printed through chemical treatment, and the inspected result must be read via image equipment which is installed in an inspection site, so that there are restrictions of time and space. Further, since it is impossible to transmit data of the inspected result over a network, it is impossible share the data in real time.

In consideration of these aspects, as the conventional industrial endoscope which has been used to visually inspect the heat transfer tubes, an endoscope which has an industrial endoscope camera (including an endoscope camera and a CCD sensor) and a belt or a chain having a cable therein has been proposed.

The conventional endoscope is problematic in that the chain or belt is thick, so that it occupies a large space when rolled into a circular shape, and therefore it is difficult to mount the endoscope to a small space such as a robot so as to inspect the interior of a narrow heat transfer tube.

Further, the conventional belt- or circular cable-type endoscope camera is problematic in that when it is constructed to be very thin, it is too flexible, so that it is difficult to maintain strength when linearly extended. Further, the endoscope camera, the cable, an illumination part and other parts are integrally installed in the chain- or belt-type feeding means, so that a bending radius is large. Thus, it is difficult to mount the conventional endoscope to a narrow space such as a robot and to handle it.

Meanwhile, in order to photograph a small space, there has been proposed Japanese Patent Laid-Open Publication No. 2006-319401, which is entitled "Remote Inspection System".

The remote inspection system includes a CMOS image sensor as an imaging device of a video camera. By manipulating a power supply for a video camera and a white LED which is connected in a conduction state through a flexible spiral metal tube to an inspection head having the white LED for illumination, the remote inspection system photographs a narrow space.

Thus, a photographing unit includes the CMOS sensor and the illumination part, so that it is possible to photograph and inspect a small space. However, since a circuit means or a transmission means for processing or transmitting a photographed image cannot be formed on the spiral metal tube itself, the circuit means or the transmission means for processing or transmitting the photographed image must be provided separately from the spiral metal tube, thus inconveniencing a manufacturer.

In order to solve the problems occurring in the conventional industrial endoscope, Korean Patent Appln No. 10-2008-79894 was filed on Aug. 14, 2008 by the inventor of the present invention and is entitled "Arc-shaped flexible printed circuit film type endoscope using imaging device".

As shown in FIGS. 1 to 3, the arc-shaped flexible printed circuit film type endoscope using the imaging device according to the cited document includes an image photographing means 10 and an object insertion means 20. The image photographing means 10 includes a head housing 13 to which an imaging device 11 having a lens 11a and an illumination means 12 are mounted, and photographs an image. The object insertion means 20 includes an arc-shaped flexible thin foil 21, an insulating adhesive film 22, a circuit film 23 and an insulating protective film 24 which are layered and inserted into the interior of an object which is to be inspected. The object insertion means 20 is connected at one end thereof to the image photographing means 10 and connected at the other end to a transmission cable 26 through a connector 25. The illumination means 12 comprises LED lamps, and is configured so that lamp supports 12b are inserted into corresponding support insertion grooves 13b of the head housing 13 in such a way that each LED lamp 12a mounted to the corresponding lamp support 12b is inserted into a corresponding lamp insertion hole 13a of the head housing 13, and thereby an LED terminal contact point formed on the back of each lamp support 12b is in contact with a terminal contact point formed on a side surface of the rear portion of the corresponding support insertion groove 13b. Further, the head housing 13 includes a plurality of lamp insertion holes 13a which are formed in the upper and lower portions of the front end of the head housing 13. The plurality of support insertion grooves 13b is formed in the head housing 13 to communicate with the lamp insertion holes 13a. A window 13c is formed in the central portion of the front end of the head housing 13. An imaging device insertion hole 13d is formed in the middle portion of the head housing 13 in a longitudinal direction thereof to communicate with the window 13c. A terminal contact point of the imaging device 11 is formed on a side surface on the rear portion of the imaging device insertion hole 13d. A connection surface 13e is provided on the rear end of the head housing 13. Pin holes 13f are formed in an end of the connection surface 13e. The image photographing means 10 and the object insertion means 20 are connected to each other via a locking part 14 and locking pins 15.

However, as shown in FIG. 4, the endoscope according to Korean Patent Appln. No. 10-2008-79894 constructed as described above is problematic in that the object insertion means 20 of the endoscope is driven between rollers 30 by frictional force acting between the rollers 30 which are rotated while being in close contact with each other, so that slippage may occur in a contact surface between the object insertion means 20 having the shape of a thin plate and the rollers 30, and thereby it is difficult to precisely control the driving of the endoscope.

SUMMARY OF THE INVENTION

Accordingly, the present invention has been made keeping in mind the above problems occurring in the prior art, and an object of the present invention is to provide an arc-shaped flexible printed circuit film type endoscope using an imaging device with driving holes, in which the driving holes are formed at regular intervals in a longitudinal direction in the flexible printed circuit film forming an object insertion means of the endoscope, and interact with a driving device having a toothed part such as an intermittent gear or sprocket, thus precisely controlling the movement of the endoscope into a small space.

Another object of the present invention is to provide an arc-shaped flexible printed circuit film type endoscope using an imaging device with driving holes, in which a flexible printed circuit film is connected to a head housing accommodating a charge coupled device (CCD) or complementary metal-oxide-semiconductor (CMOS) sensor, so that the endoscope can be mounted in a small space such as a robot owing to a small bending radius to be conveniently handled in the small space, thus making it easy to inspect a narrow heat transfer tube or gaps formed between heat transfer tubes.

A further object of the present invention is to provide an arc-shaped flexible printed circuit film type endoscope using an imaging device with driving holes, which utilizes a flexible printed circuit film so that a circuit means or a transmission means for processing or transmitting an image photographed by the imaging device are formed on the flexible printed circuit film, thus realizing a simple structure, therefore achieving high economic efficiency due to a reduction in the time and costs required to manufacture a product, and increasing the reliability of endoscopy because there is no possibility of failure or malfunction, and increasing the lifespan of the endoscope such that it can be reliably used for a lengthy period of time.

In order to accomplish the above objects, the present invention provides an arc-shaped flexible printed circuit film type endoscope using an imaging device with driving holes, which includes an image photographing means having a head housing to which an imaging device and illumination means are mounted and photographing an image, and an object insertion means having an arc-shaped flexible thin foil, an insulating adhesive film, a circuit film and an insulating protective film which are layered and inserted into an object which is to be inspected. The object insertion means is connected at a first end thereof to the image photographing means and connected at a second end thereof to a transmission cable via a connector. The endoscope includes a plurality of driving holes which are formed at regular intervals in a longitudinal direction of the object insertion means, and a driving means rotating while being sequentially inserted into the driving holes, thus moving the object insertion means.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, an arc-shaped flexible printed circuit film type endoscope using an imaging device with driving holes according to the preferred embodiment of the present invention will be described in detail with reference to the accompanying drawings.

Figure 1:
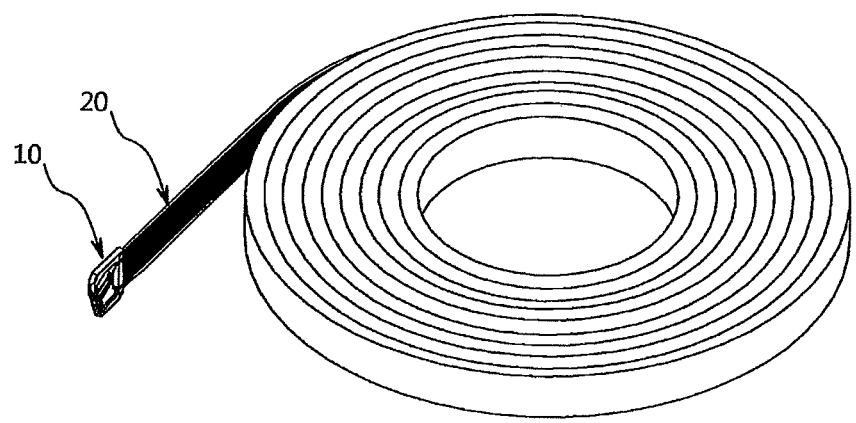
FIG. 1 is a perspective view illustrating a conventional arc-shaped flexible printed circuit film type endoscope using an imaging device.
Figure 2:
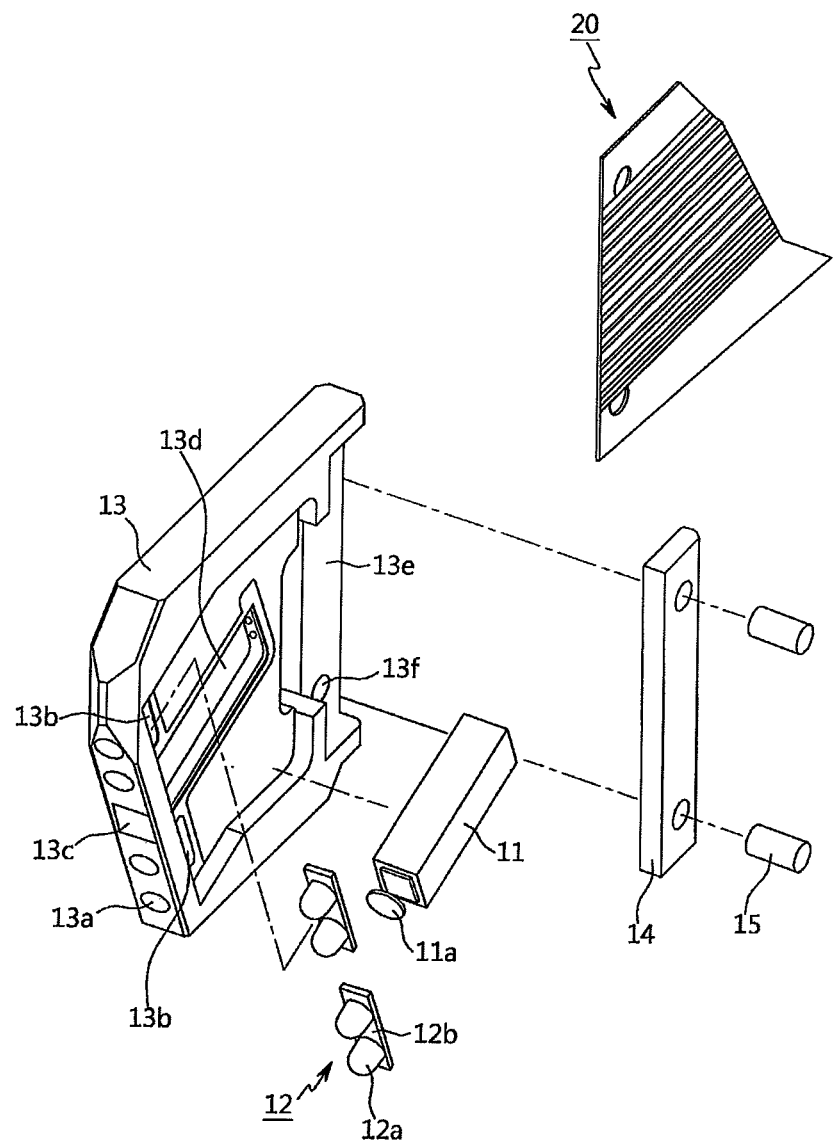
FIG. 2 is an exploded perspective view depicting the important parts of the conventional arc-shaped flexible printed circuit film type endoscope using the imaging device.
Figure 3:
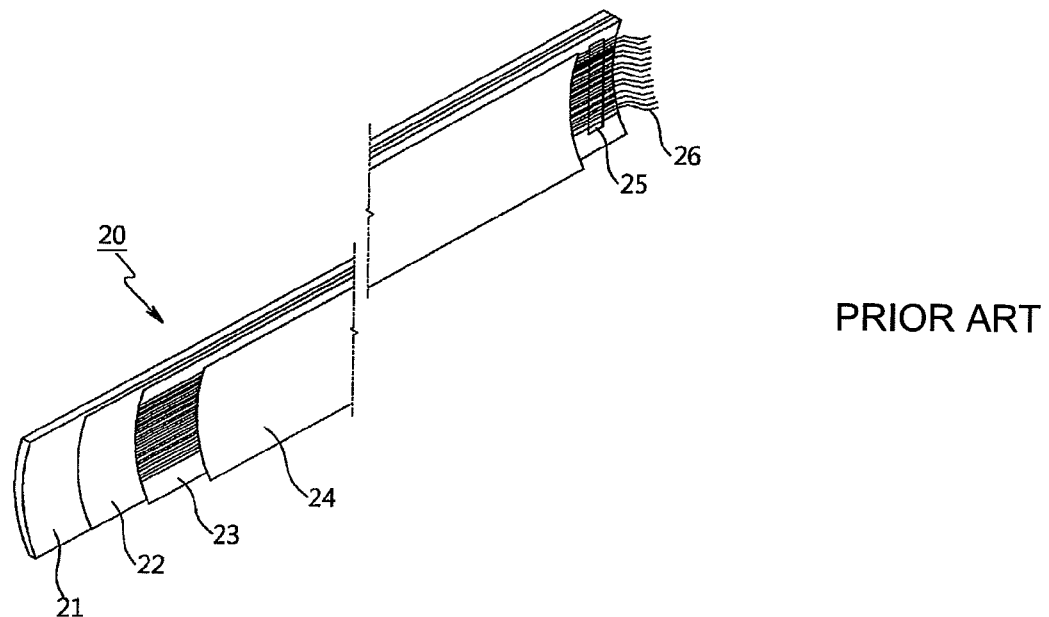
FIG. 3 is a view illustrating an object insertion means of the conventional endoscope.
Figure 4:
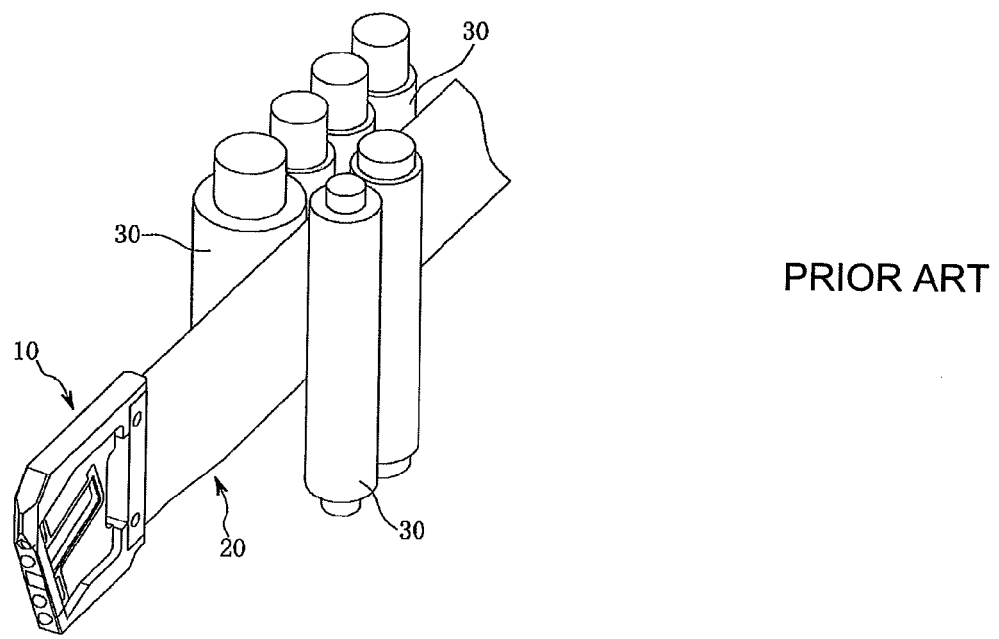
FIG. 4 is a view illustrating a driving state using a driving means of the conventional endoscope.
Figure 5:
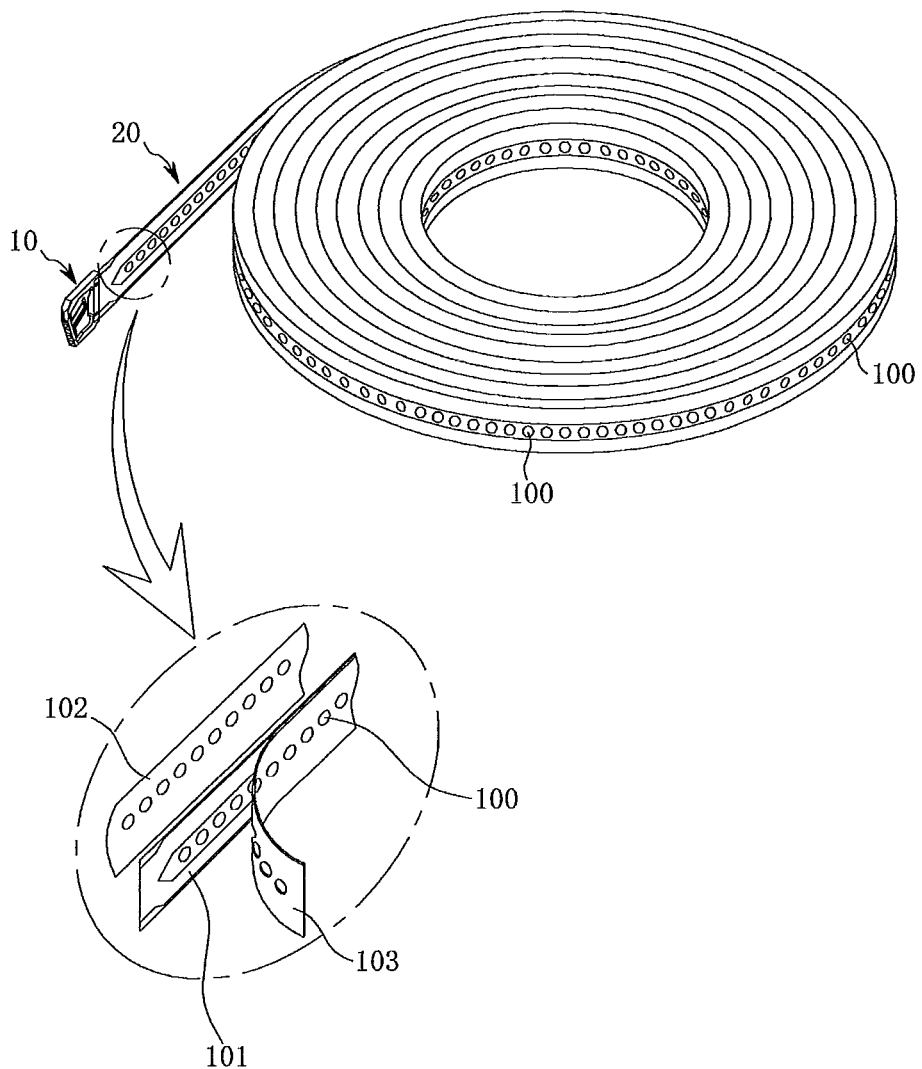
FIG. 5 is a perspective view illustrating an arc-shaped flexible printed circuit film type endoscope using an imaging device with driving holes, according to the present invention.
Figure 6:
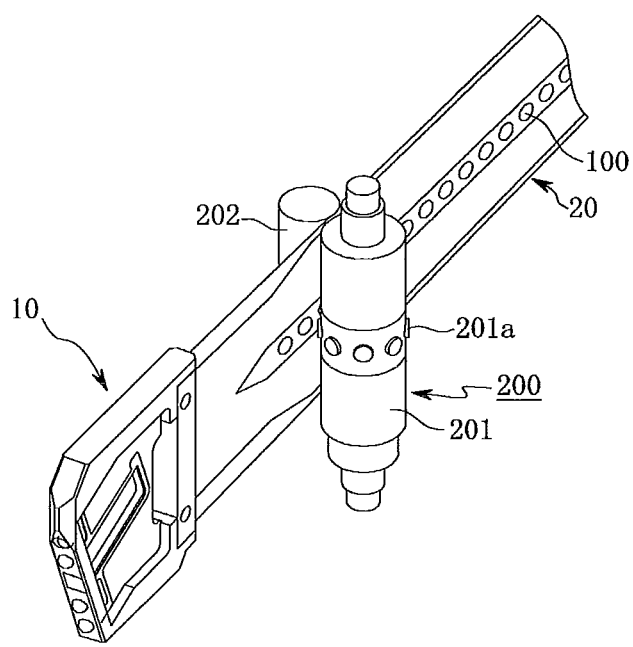
FIG. 6 is a perspective view illustrating a driving means of the arc-shaped flexible printed circuit film type endoscope using the imaging device with the driving holes, according to the present invention.

FIG. 5 is a perspective view illustrating an arc-shaped flexible printed circuit film type endoscope using an imaging device with driving holes, according to the present invention, and FIG. 6 is a perspective view illustrating a driving means of the arc-shaped flexible printed circuit film type endoscope using the imaging device with the driving holes, according to the present invention. The arc-shaped flexible printed circuit film type endoscope using the imaging device with the driving holes according to the present invention includes an image photographing means 10 and an object insertion means 20. The image photographing means 10 includes a head housing to which an imaging device and an illumination means are mounted, and photographs an image. The object insertion means 20 includes an arc-shaped flexible thin foil, an insulating adhesive film, a circuit film and an insulating protective film which are layered and inserted into the interior of an object which is to be inspected. The object insertion means 20 is connected at one end thereof to the image photographing means 10 and connected at the other end to a transmission cable through a connector. The endoscope includes a plurality of driving holes 100 which are formed at regular intervals in the longitudinal direction of the object insertion means 20, and a driving means 200 which rotate while being sequentially inserted into the driving holes 100, thus moving the object insertion means 20.

The plurality of driving holes 100 are formed at regular intervals along the central portion of the object insertion means 20 in the longitudinal direction thereof. A printed circuit film 101 is provided between both edges of the object insertion means 20 and the driving holes 100, an arc-shaped flexible thin foil 102 is attached to the back surface of the printed circuit film 101, and an insulating protective film 103 is attached to the front surface of the printed circuit film 101.

Further, the plurality of driving holes may be formed at regular intervals in a longitudinal direction between the central portion of the object insertion means 20 and both edges of the object insertion means 20, and the printed circuit film 101 may be provided on a portion having no driving hole.

Further, the driving means includes a driving roller 201 and a driven roller 202. The driving roller 201 is provided on one side of the object insertion means 20, and has a plurality of cylindrical protrusions 201a which are arranged at regular intervals along the outer circumference of the driving roller 201. The driven roller 202 is provided on the other side of the object insertion means 20 in such a way as to be in close contact with the driving roller 201.

The operation of the arc-shaped flexible printed circuit film type endoscope using the imaging device with the driving holes according to the present invention constructed as described above will be described below.

When a user desires to observe narrow gaps between heat transfer tubes using the endoscope of the present invention, the image photographing means 10 which is provided on the head of the endoscope must be precisely pushed into a portion which is to be inspected. To this end, the endoscope of this invention rotates the driving roller 201 forwards at a precise rotating amount by a device having an additional control unit which is not shown in the drawings.

Thereby, the driven roller 202 which is in close contact with the driving roller 201 rotates along with the driving roller 201. At this time, the cylindrical protrusions 201a of the driving roller 201 are sequentially inserted into the driving holes 100 of the object insertion means 20 which is disposed between the driving roller 201 and the driven roller 202. Thus, as the driving roller 201 rotates forwards, the image photographing means 10 of the endoscope according to this invention precisely moves forwards into the object which is to be inspected, and is inserted into the desired depth into the object. Meanwhile, as the driving roller 201 rotates backwards, the image photographing means 10 of the endoscope according to this invention precisely moves backwards from the object which is to be inspected, and is dislodged from the object.

As described above, the present invention provides an arc-shaped flexible printed circuit film type endoscope using an imaging device with driving holes, in which the driving holes are formed at regular intervals in a longitudinal direction in the flexible printed circuit film forming an object insertion means of the endoscope, and interact with a driving device having a toothed part such as an intermittent gear or sprocket, thus precisely controlling the movement of the endoscope into a small space, and in which a flexible printed circuit film is connected to a head housing accommodating a CCD or CMOS sensor, so that the endoscope can be mounted in a small space such as a robot owing to a small bending radius to be conveniently handled in the small space, thus making it easy to inspect a narrow heat transfer tube or gaps formed between heat transfer tubes, and which utilizes a flexible printed circuit film so that a circuit means or a transmission means for processing or transmitting an image photographed by the imaging device are formed on the flexible printed circuit film, thus realizing a simple structure, therefore achieving high economic efficiency due to a reduction in the time and costs required to manufacture a product, and increasing the reliability of endoscopy because there is no possibility of failure or malfunction, and increasing the lifespan of the endoscope such that it can be reliably used for a lengthy period of time.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An arc-shaped flexible printed circuit film type endoscope using an imaging device with driving holes, including image photographing means having a head housing to which an imaging device and illumination means are mounted and photographing an image, and object insertion means having an arc-shaped flexible thin foil, an insulating adhesive film, a circuit film and an insulating protective film which are layered and inserted into an object which is to be inspected, the object insertion means being connected at a first end thereof to the image photographing means and connected at a second end thereof to a transmission cable via a connector, the arc-shaped flexible printed circuit film type endoscope comprising:
   a plurality of driving holes formed at regular intervals in a longitudinal direction of the object insertion means; and
   driving means rotating while being sequentially inserted into the driving holes, thus moving the object insertion means.

2. The arc-shaped flexible printed circuit film type endoscope as set forth in claim 1, wherein the plurality of driving holes are formed at regular intervals along a central portion of the object insertion means in the longitudinal direction thereof, a printed circuit film is provided between both edges of the object insertion means and the driving holes, an arc-shaped flexible thin foil is attached to a back surface of the printed circuit film, and an insulating protective film is attached to a front surface of the printed circuit film.

3. The arc-shaped flexible printed circuit film type endoscope as set forth in claim 1, wherein the plurality of driving holes are formed at regular intervals in the longitudinal direction between a central portion of the object insertion means and both edges of the object insertion means, and a printed circuit film is provided on a portion having no driving hole.

4. The arc-shaped flexible printed circuit film type endoscope as set forth in claim 1, wherein the driving means comprises:
   a driving roller provided on a first side of the object insertion means and having a plurality of cylindrical protrusions arranged at regular intervals along an outer circumference of the driving roller; and
   a driven roller provided on a second side of the object insertion means in such a way as to be in close contact with the driving roller.

* * * * *